United States Patent [19]

Becoat

[11] Patent Number: 5,004,258
[45] Date of Patent: * Apr. 2, 1991

[54] KIT FOR CONVERTING A BICYCLE TO A DUAL WHEEL DRIVEN CYCLE

[76] Inventor: Billie J. Becoat, 914 Hampton, Alton, Ill. 61604

[*] Notice: The portion of the term of this patent subsequent to Jan. 23, 2007 has been disclaimed.

[21] Appl. No.: 404,695

[22] Filed: Sep. 8, 1989

Related U.S. Application Data

[63] Continuation of Ser. No. 98,498, Sep. 18, 1987, Pat. No. 4,895,385.

[51] Int. Cl.$^5$ .............................................. B62M 1/02
[52] U.S. Cl. ........................... 280/259; 74/665 GE; 280/260; 280/261; 474/78; 474/79; 474/80
[58] Field of Search ............... 280/234, 236, 248, 259, 280/260, 261; 74/351, 415, 594.2, 665 GE; 474/78, 79, 80

[56] References Cited

U.S. PATENT DOCUMENTS

| | | |
|---|---|---|
| 567,042 | 9/1896 | Raymond . |
| 622,758 | 4/1899 | Crutchfield . |
| 3,873,128 | 3/1975 | Dunder et al. . |
| 4,029,332 | 6/1977 | Davis . |
| 4,479,660 | 10/1984 | Pattison .............................. 280/261 |

OTHER PUBLICATIONS

Rokon Trail-Breaker.

*Primary Examiner*—Mitchell J. Hill
*Attorney, Agent, or Firm*—Allegretti & Witcoff, Ltd.

[57] ABSTRACT

A dual driven cycle and a kit for converting conventional, single driven cycles into dual driven cycles are disclosed. The invention is suitable for accommodating bicycles, motorcyles, dirt bikes, and other conventional cycles. These cycles have the known elements of a pedal-gear-chain driven first wheel and a non-driven second wheel. The kit comprises four general elements. First, a sprocket is connectable in fixed relation to the non-driven second wheel for conjoint movement with that wheel. Second, to receive power from the conventional drive train, a drive gear is mounted on either the pedal gear or chain of the cycle. Third, a cable gear is provided for mounting with respect to the cycle's frame and meshing with the sprocket. This cable gear drives the sprocket and, of necessity, the cycle's previously non-driven second wheel. The final general element of the kit is a rotatable cable which connects the cable gear to the drive gear and transfers the rotational motion of the drive gear to the second wheel.

17 Claims, 5 Drawing Sheets

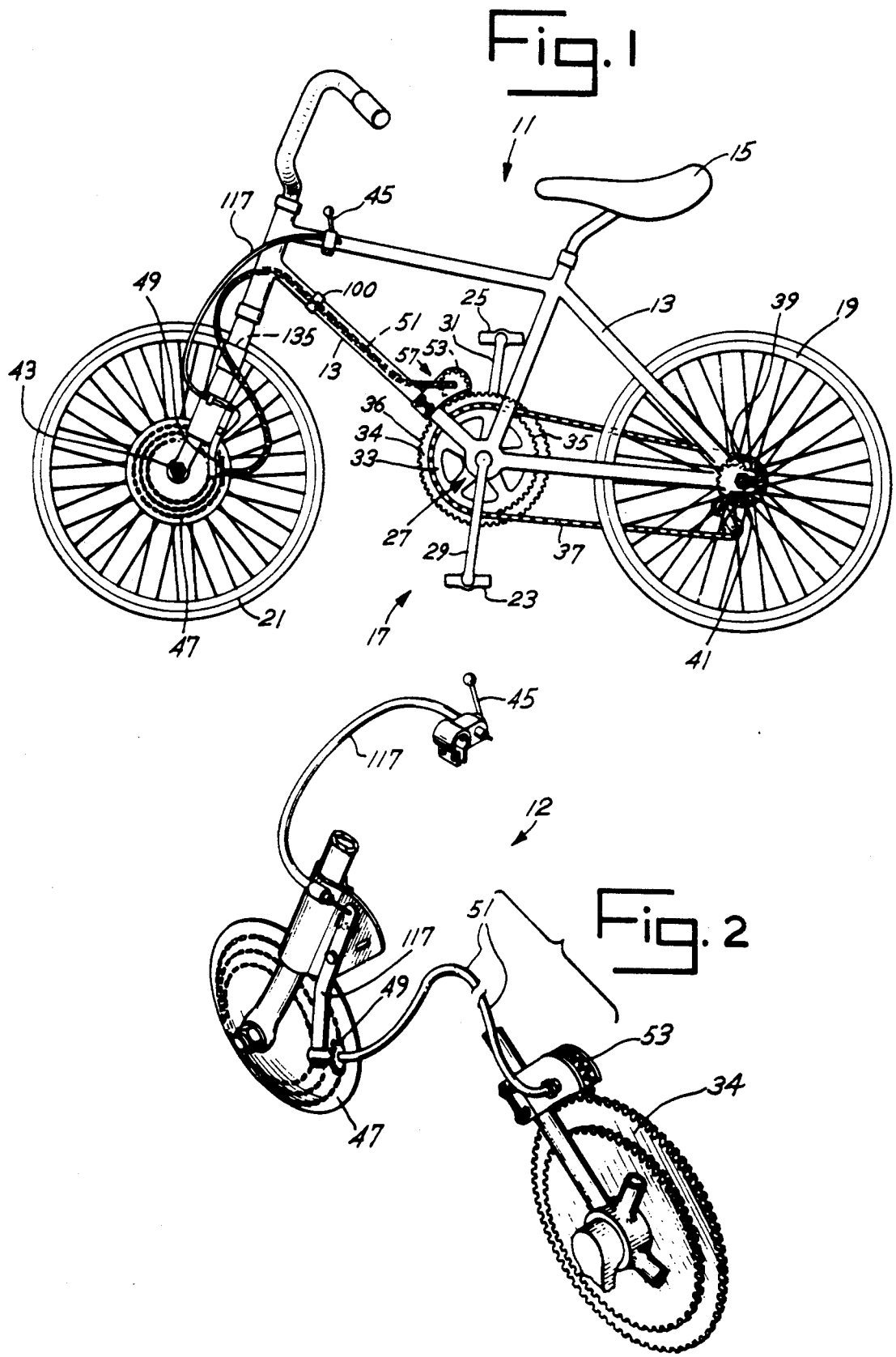

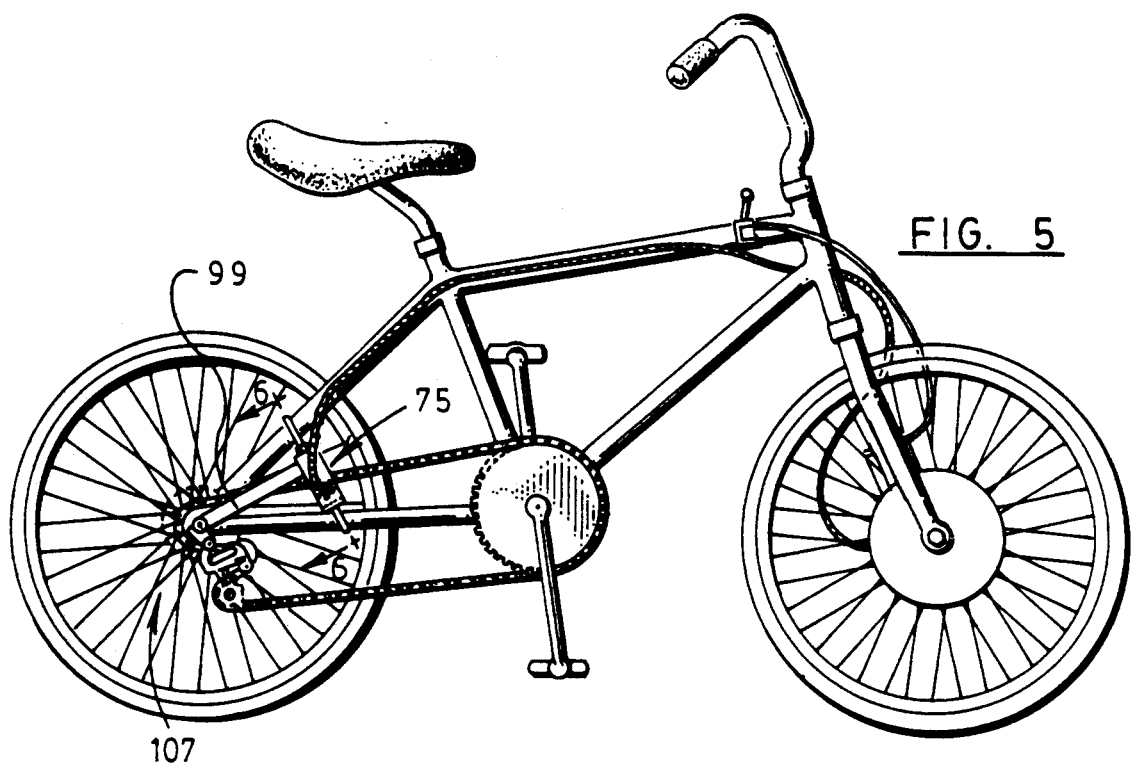
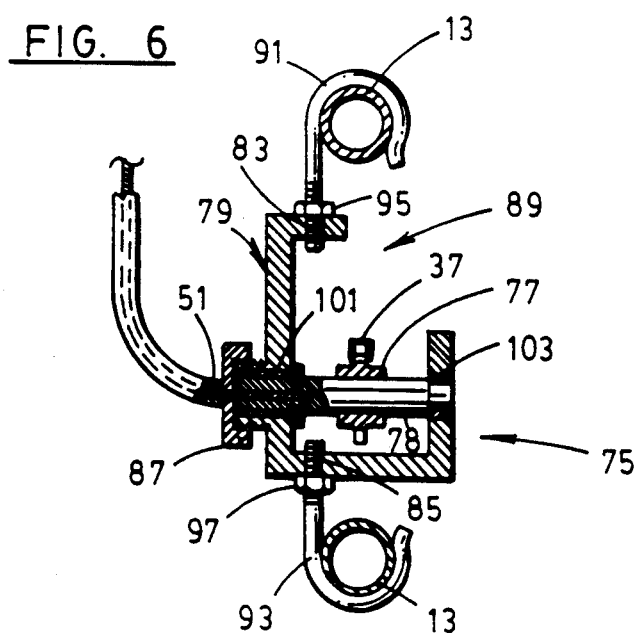

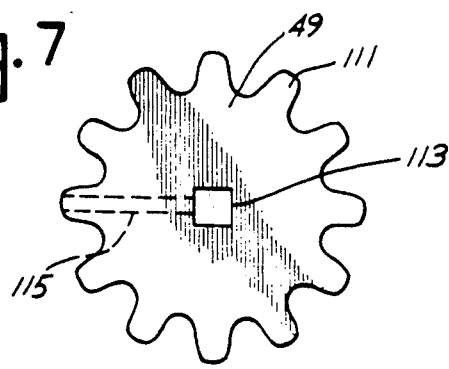
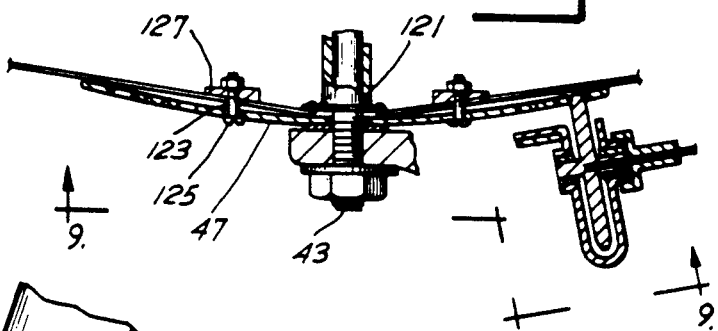
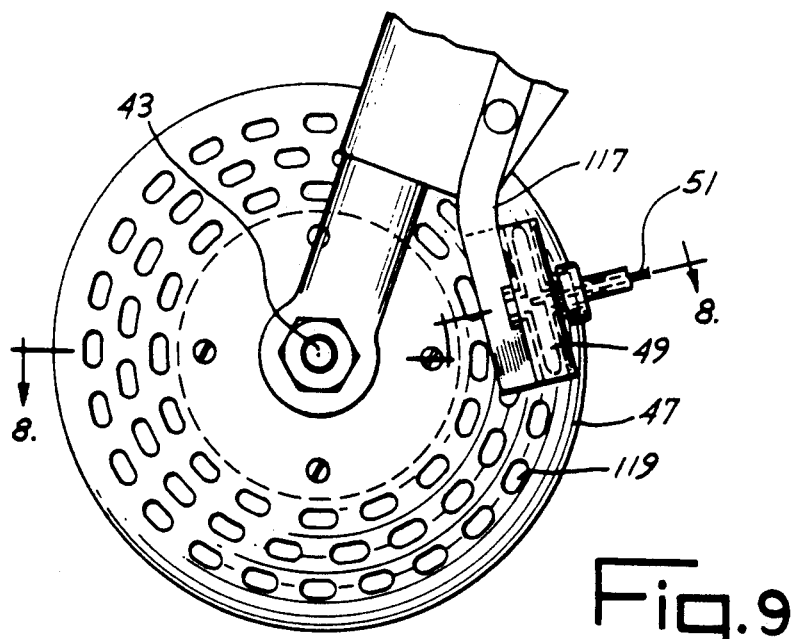

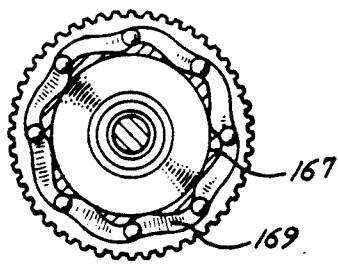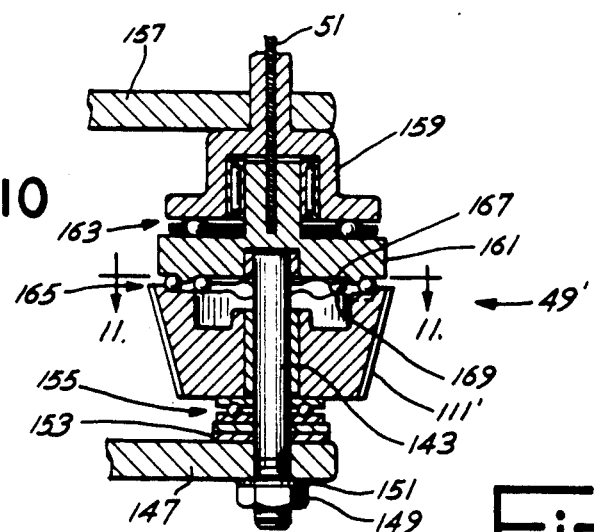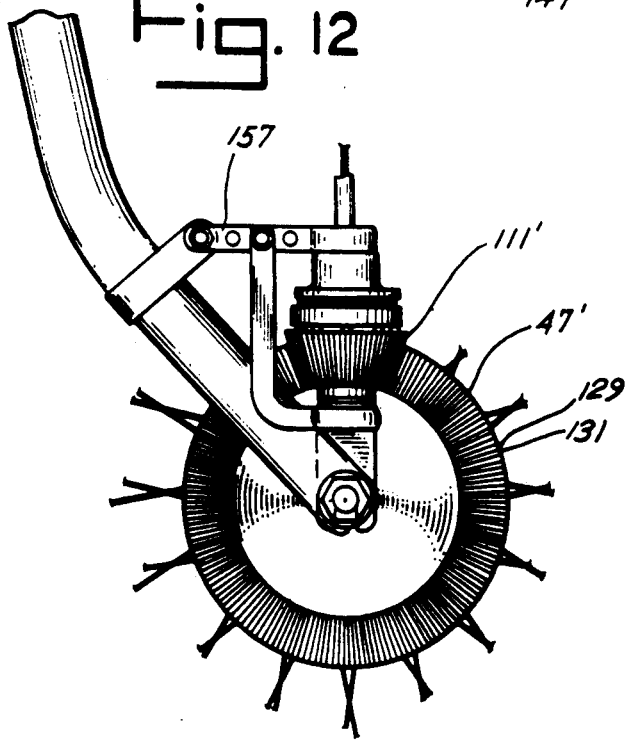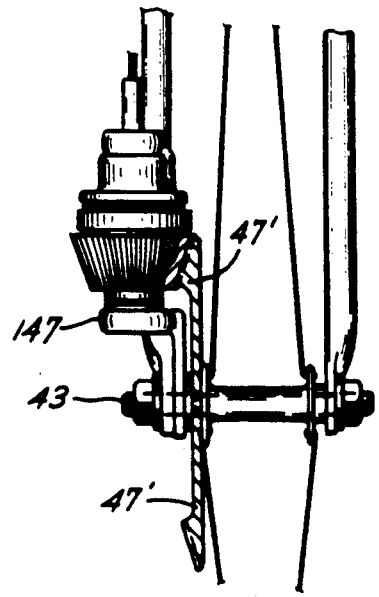

KIT FOR CONVERTING A BICYCLE TO A DUAL WHEEL DRIVEN CYCLE

This is a continuation of application Ser. No. 098,498, filed Sept. 18, 1987, issued as U.S. Pat. No. 4,895,385 on Jan. 23, 1990.

BACKGROUND OF THE INVENTION

The present invention relates generally to a dual wheel driven cycle and, more particularly, to a kit for converting a conventional bicycle, motorcycle, dirt bike, or the like, to a dual wheel driven cycle.

The kit according to this invention includes a sprocket connectable in fixed relation to the conventionally non-driven front wheel of a conventional cycle for conjoint movement with that wheel. A drive gear is mounted on either the pedal gear or chain of the cycle and receives power from the pedal gear or chain on which it is mounted. The kit provides a cable gear mountable with respect to the cycle's frame and meshable with the front wheel sprocket for driving the sprocket and thus driving the cycle's previously non-driven front wheel. A rotatable cable connects the cable gear to the drive gear. The cable transfers the rotational motion of the drive gear to the front wheel.

The sprocket is capable of at least two alternative constructions. The first construction contains a series of radially spaced concentric slots which engage the teeth of the cable gear. In the second construction, alternating rows of gear teeth and notches or grooves on the sprocket engage the cable gear teeth.

The sprocket may be attached to the conventionally non-driven wheel in at least two ways. The kit may include clips for securing the sprocket to the spokes of the non-driven wheel. Alternatively, the kit may include a sprocket having a rigid shaft formed integral with the sprocket in order that the sprocket may be mounted onto the axle of the non-driven wheel. The sprocket has a central passage for aligning the sprocket with respect to the axle of the non-driven wheel.

The kit also includes gear support structure fixable to the bicycle frame for supporting the drive gear in relation to the pedal gear or chain of the cycle. Plastic straps are provided to secure the drive cable to the frame. A spread clamp is provided to attach the cable gear to the frame. Finally, a control lever is attached at one end to the gear selector of the cycle and at its other end to the cable gear; the lever moves the cable gear relative to the sprocket in response to operator gear selection. This allows speed synchronization of the previously non-driven, but now-driven, wheel with the driven rear wheel. It also allows the now-driven front wheel to operate at a variety of speeds.

The invention has a wide variety and range of applications and uses. It is particularly useful on bicycles having single, three, or ten speed gear selections. The elements of the kit are placed in cooperation with the parts of the bicycle. Through standard operation of the bicycle parts, the kit elements drive the bicycle's normally non-driven wheel and create a dual driven cycle.

Presently known devices for driving the wheels of a cycle abound. These devices include combinations of levers and gears which allow the operator to drive the rear wheel. They encompass a variety of drive transmissions, conventional derailleur and other mechanisms, which adjust the transmission ratio between the rear driven wheel and the pedal gear. Some of these devices are removable and permit cleaning, repairing, or mounting on existing bicycles.

One device, that is disclosed in U.S. Pat. No. 4,029,332 issued to Harry C. Davis, is a rotacycle. This rotacycle includes a two-wheel friction drive. The automatic, variable-speed transmission of the rotacycle has a central rotor in friction-tight contact with a plurality of pulley wheels. These pulley wheels are flexibly connected with mating wheels to impart torque to the perimeter of the first and second wheels.

All of these devices may be grouped, however, into two categories. The first category includes devices which can be adapted for use on conventional cycles. Such devices often require time, a number of steps, skill, and perhaps a variety of tools to connect and disconnect the device and cycle.

Moreover, devices in this first category usually are expensive to manufacture and difficult to maintain. They include an array of obstructive cables and protruding levers. Most importantly, none of these devices drive the second wheel of the cycle.

The second category of known devices for driving cycle wheels includes those which drive both cycle wheels. These devices are not adaptable with conventional cycles; rather, they represent separate, complete mechanisms. In addition, friction-tight mating surfaces are the driving elements in these devices, and friction usually causes wear and prevents durability.

Adaptable for use on conventional cycles or not, none of the presently known devices includes elements that receive power from the conventional cycle's existing drive chain and use that power to drive the cycle's second, non-driven wheel. Absent such elements, none of the presently known devices can attain the advantages of the present invention.

SUMMARY OF THE INVENTION

It is an object of the invention to provide a kit that can convert a conventional cycle into a dual wheel driven cycle while avoiding the disadvantages of the known devices. More specifically, one object of the invention is to provide a reliable, dual driven cycle that is durable and relatively easy to maintain. A cycle with these characteristics reduces accidents during road use.

A related object is to provide better traction. As recognized in the automobile industry, front wheel drive vehicles offer better traction, especially under adverse weather conditions. Increased safety follows an increase in traction. The inventive design provides front gear braking power, if needed, which gives the operator greater control over the cycle. Thus, safety is further enhanced.

Durability is a desireable feature; therefore, it is an object of this invention. A dual drive cycle promotes even wear of tires and reduces both tire replacement and accidents caused by tire failure.

A further object is to minimize the cost of manufacture. This object is attained by using elements which are easily manufactured in known processes. Similarly, it is an object to minimize the number of elements. This reduces the cost of manufacture, increases durability, and promotes safety.

Related to the previous object, another object is to have all wearing parts easily accessible and replaceable without using special tools or removing the entire kit from the cycle. Maintenance of the kit is improved when this object is attained. Moreover, the kit can be installed initially on any cycle with few tools.

Modern cyclists desire higher speeds. A dual drive cycle can satisfy this desire. It is also an object to provide more hill pulling power, for roads are seldom level and grades are seldom uniform. A further object is to divide the power output of a conventional cycle by using the second, non-driven wheel.

A final object of this invention is to assure mobility. Chains often create a "weak link" in the drive mechanism of conventional cycles; the chains break and render the cycle inoperable. Because the kit of this invention can take power directly from the pedal gear, the cycle remains mobile even with a broken chain.

Further objects and advantages of the present invention will be apparent from the following detailed description and the claims, when considered with the accompanying drawings.

BRIEF DESCRIPTION OF THE DRAWING

A preferred embodiment of the present invention will be described, in detail, with reference to the drawings wherein:

FIG. 1 is a side view of a bicycle converted to a dual wheel driven bicycle by an embodiment of the present invention;

FIG. 2 is a perspective view of a kit embodiment of the present invention for converting a bicycle to a dual wheel driven bicycle of FIG. 1;

FIG. 3 is a side view of the drive gear assembly of the bicycle of FIG. 1;

FIG. 4 is a top view of the drive gear assembly shown in FIG. 3;

FIG. 7 is a side view of a cable gear of the bicycle of FIG. 1;

FIG. 8 is top view of a sprocket and cable gear assembly of the bicycle of FIG. 1.

FIG. 9 is a side view of the sprocket and cable gear assembly of FIG. 8.

FIG. 10 is a cross-sectional side view of an alternative cable gear.

FIG. 11 is a top view of the cable gear of FIG. 10 taken along line 11—11.

FIG. 12 is a side view of an alternative sprocket and cable gear assembly of the bicycle of FIG. 1.

FIG. 13 is a cutaway cross-sectional end view of the cable gear assembly of FIG. 12.

DESCRIPTION OF A PREFERRED EMBODIMENT

Figure 5:
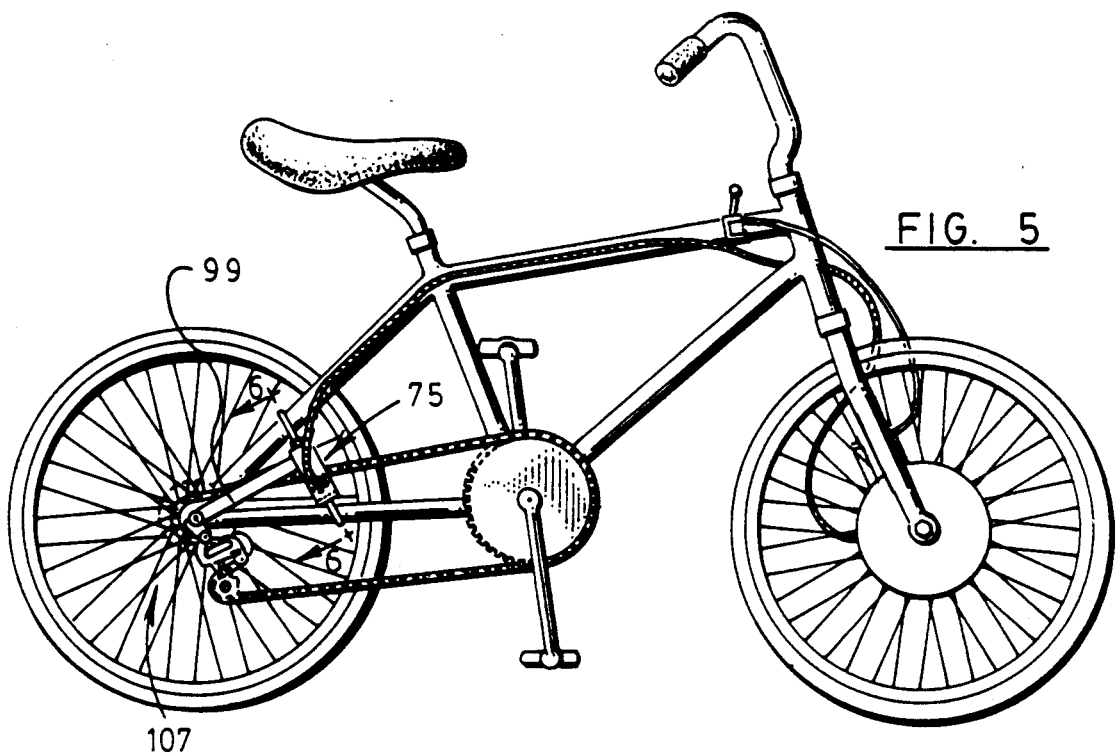
FIG. 5 is a side view of an alternative drive gear assembly.

Referring to FIG. 1, a conventional bicycle 11 is converted into a dual wheel driven bicycle as shown. The bicycle, in its conventional form, has a frame 13, a seat 15 which is adjustably mounted to the frame, a pedal drive train 17, a first or rear wheel 19, and a second or front wheel 21. Drive train 17 is conventional and includes a pair of pedals 23, 25, a crank 27 having two arms 29, 31, a pedal gear 33 having peripheral teeth 35, and a chain 37.

An operator rotates the pedals in a conventional fashion for driving rear wheel 19. Power supplied to pedals 23, 25 causes crank arms 29, 31 to rotate pedal gear 33. As pedal gear 33 rotates, teeth 35 engage chain 37 driving the chain. Chain 37 is connected around a conventional sprocket 39, which is fixed to rear wheel 19 and rotates the gear wheel around its axle 41 to propel the bicycle. Front wheel 21 is conventional and rotates about its own axle 43. Some conventional bicycles include a gear selector (not shown) for selecting the gear ratio at which the bicycle is driven.

The conventional bicycle as described above is converted into a dual wheel driven bicycle by a front wheel sprocket 47, a free wheeling cable gear 49, a drive cable 51, and a drive gear 53 which receives power from a sprocket gear 34 connected to pedal gear 33. A separate conversion kit comprises of these components and associated structure may be used to convert a conventional bicycle to a dual driven cycle. The separate components forming the kit are shown in FIG. 2, and the kit is generally referred to by reference numeral 12. Alternatively, a dual wheel driven bicycle may be constructed originally, rather than converted, if so desired, as an O.E.M. product.

Referring to FIG. 1, front wheel sprocket 47 is connected in a fixed relation to front wheel 21 for rotation about axle 43. Sprocket gear 34 is connected in a fixed relation with pedal gear 33 for rotation about the rotational axis of gear 33. Drive gear 53 is mounted onto frame 13 in a position for engagement with a set of teeth 36 carried by sprocket gear 34 for driving gear 53 in a rotational movement. The rotational motion of drive gear 53 is transferred to front sprocket 47 via cable 51.

As shown in FIGS. 3 and 4, drive gear 53 is mounted to frame 13 by a gear support structure, generally indicated by reference number 55, for supporting drive gear 53 in relation to teeth 36 of sprocket gear 34. The gear support structure includes a housing 57 which is secured to frame 13 for supporting drive gear 53, as shown. The drive gear extends outward from housing 57 in a position for meshing with teeth 36 of sprocket gear 34. Sprocket gear 34 is formed of a flat plate having four apertures 38 for receiving bolts 40 (FIG. 4) to connected gear 34 in a fixed relation with conventional pedal gear 33. As shown in FIG. 4, sprocket gear 34 lies in a plane parallel to pedal gear 33 and may be spaced therefrom by the four bolts 40.

Kit 12 includes an assembly of both pedal gear 33 and sprocket gear 34 connected together by bolts 40. The conventional pedal gear 33 found on the bicycle may be removed from the bike and discarded. The new pedal gear assembly (33, 34) may then be placed onto crank 27. As will suggest itself, crank 27 may also be included in the pedal gear assembly of kit 12 if desired. It is desired to make the conversion of the bicycle as simple as possible for the purchaser of the kit.

As shown in FIG. 4, drive gear 53 includes an axle 59 which is rotatably mounted between two wall members 61, 63 of the housing 57. The wall members are connected to frame 13 and each wall member provides a circular hole 65 which serves as a bearing for axle 59. The inside end of axle 59 is threaded for receiving a threaded annular connector 67. Connector 67 is rigidly fixed to one end of cable 51 and turns with the cable. The drive cable includes a protective casing 69 which surrounds the drive cable and permits its rotational movement within the casing. Casing 69 may be lubricated within to permit free rotation of the cable and the casing can withstand being out in the weather unprotected.

The outer end 68 of axle 59 may be formed of a larger diameter than the bearing hole in order to retain the axle in position. Likewise connector 67 may be larger than the diameter of the bearing hole in member 63. As shown in FIG. 3, the outer wall 61 is removed in the area of the sprocket gear 34 to permit the drive gear 53 to mesh with sprocket gear 34. A cover member (not shown) may cover the gear 53 except in the area of engagement.

Housing 57 includes four holes for receiving bolts 71 to secure housing 57 relative to frame 13. Housing 57 is mounted onto the frame so that the fingers or teeth 73 of drive gear 53 mesh with teeth 36 of sprocket gear 34. Thus, as pedal gear 33 rotates in one direction, drive gear 53 is rotated in the opposite direction. As will suggest itself, bolts 71 may be positioned where appropriate in housing 57 and the particular securement structure used may be shaped as appropriate in order to secure housing 57 relative to the frame.

The conversion kit includes housing 57 (and its associated drive gear and drive cable) together with four bolts for securing the housing onto the frame.

Figure 6:
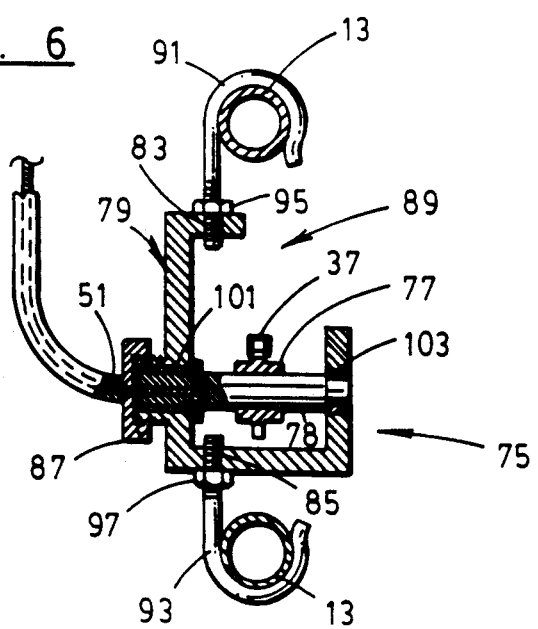
FIG. 6 is a cross-sectional end view of the drive gear assembly shown in FIG. 5.

Referring to FIGS. 5 and 6, an alternative gear support structure 75 and an alternative drive gear 77 may be used, particularly, for the converting of multiple speed bicycles. Structure 75 includes a housing 79 for a supporting drive gear 77 in a position for meshing with chain 37. Housing 79 is formed of four walls with a pair of threaded openings 83, 85 formed in the top and bottom side walls, respectively.

Drive gear 77 includes an axle 78 which is rotatably mounted between two walls of housing 79 as shown. A threaded connector 87 is fixed to cable 51 and threaded onto axle 78 of drive gear 77. An opening 89 is formed in the top side of the housing for receiving chain 37 to permit its engagement with drive gear 77.

A pair of adjustable hooks 91, 93 include threaded ends for securement into openings 83, 85 in housing 79. A pair of adjustable bolts 95, 97 are threaded onto the threaded ends of hooks 91, 93 and serve to lock the hooks to housing 79. The ends of hooks 91, 93 opposite the threaded ends are curved in a hook shape to encompass frame 13 to lock housing 79 securely onto the frame. As shown in FIG. 5, a bracket clamp 99 is secured between housing 79 and the axle 41, as shown, to maintain hooks 91, 93 in a stationary position. Alternatively, bracket clamp 99 may be bolted to the frame and positioned to extend to housing 79 in order to maintain the hooks in a stationary position.

Housing 79 has a pair of bushings 101, 103 which are mounted on opposite side walls of housing 79 for rotatably receiving axle 78. Drive gear 77 is securely mounted to axle 78 for rotation therewith. Bushings 101, 103 permit axle 78 to slide horizontally within house 81 in order to accommodate horizontal movement of chain 37 caused by a conventional derailer 107. As the operator changes gears, derailer 107 moves chain 37 up and down and inward and outward on rear axle 41. If necessary, other structure may be utilized to retain chain 37 onto gear 77 as the derailer 107 moves the chain up and down.

Drive gear 77 is circular in shape and includes a plurality of teeth 109 formed along its perimeter for meshing with chain 37. Housing 79 is mounted onto frame 13 in a position so that teeth 109 of drive gear 77 mesh with chain 37. Thus, as the chain rotates, drive gear 77 is rotated. Cable 51, which is attached to the drive gear, is then rotated.

As will suggest itself, chain 37 may instead pass under gear 77 (as viewed from FIG. 6), or cable 51 may instead connect to the right side of axle 78 (as viewed from FIG. 6). However, it should be understood that cable 51 must be rotated in a certain direction in order to provide forward motion to front wheel 21.

In both alternative housings 57, (FIG. 3) and 79 (FIG. 5), cable 51 is rotatably attached to a drive gear 57, 77 at one end of the cable. Cable 51 is secured to frame 13 by plastic straps 100 (FIG. 1). The other end of cable 51 which is opposite drive gear 57 is attached to cable gear 49. Thus, rotation of cable 51 causes cable gear 49 to rotate.

Referring to FIG. 7 cable gear 49 has multiple cable gear blades 111 for engaging front wheel sprocket 47 and driving front wheel 21. A cable hole 113 is provided in cable gear 49 to receive the end of cable 51. A passageway 115 is located perpendicular to cable hole 113 for receiving a conventional set screw (not shown) for fixing cable 51 within the cable hole. Cable hole 113 may be threaded, however, to mate with a conventional threaded coupling to fix cable 51 to cable gear 49. Such a coupling is presently used for attaching conventional speedometer cables. This method of attachment avoids a need for passageway 115.

Referring to FIG. 2, a speed control lever arm 117 is operated by a shift selector 45. Lever arm 117 is fixed at its other end to cable gear 49, as shown in FIG. 9. Gear 49 is rotatably mounted to the end of lever arm 117 for rotation by cable 51. Lever arm 117 is controlled by the operator to move cable gear 49 radially in toward axle 43 of the front wheel 21 or out toward the periphery of front sprocket 47. Lever arm 117 and attached selector 45 are included in the kit, as indicated in FIG. 2.

Two alternative sprockets 47 may be used. As shown in FIG. 8, sprocket 47 has slots 119 aligned in several radially-separated series of slots. Each series of slots 119 forms a circular path concentric with axle 43. Gear blades 111, engage slots 119 of sprocket 47 for driving the sprocket as gear 49 rotates, causing front wheel 21 to rotate.

Sprocket 47 has an axial passage 121 (FIG. 8) which fits over axle 43 for mounting sprocket 47 onto the axle. A number of bolt holes 123 are disposed in sprocket 47 for receiving bolts 125. A spoke clip 127 surrounds the spokes of wheel 21 and receives a bolt 125 for fixing sprocket 47 to the spokes. Thus, the sprocket is fixedly connected to the front wheel. As will suggest itself, wheel 21 may be spokeless and formed of a solid disc hub having slots 119 formed therein.

Referring to FIGS. 10-13, a second alternative sprocket 47' has alternating rows of gear teeth 129 and notches or grooves 131. Blades 111' of the cable gear engage teeth 129 of sprocket 47' for driving the sprocket and causing the front wheel to rotate.

Sprocket 47' also has an axial passage which fits over axle 43 for mounting sprocket 47' onto the axle. Sprocket 47' may be secured to the spokes or hub of the wheel in a conventional manner.

As shown in FIG. 10, cable gear 49' is shown having blades 111' cut in the gear surface for meshing with front wheel sprocket 47'. Gear 49' is rotatably mounted on a gear shaft 143 which is supported out from the front wheel frame fork 145 (FIG. 13). An angle bracket 147 is mounted to the front axle 43 and receives gear shaft 143 at its extended end. Shaft 143 is threaded at one end for receiving a nut 149 and a washer 151 (FIG. 10). A bearing stop 153 and ring bearing (or roller bearing) 155 support gear 49' permitting the gear to rotate freely.

The upper portion of angle bracket 147 is adjustably connected to a horizontal bracket member 157. The extended end of bracket member 157 holds an annular nut 159 which faces gear 49' and rotatably receives cable 51. The end of cable 51 is secured to a cable driver 161 located between annular nut 159 and gear 49'. Bearings 163, 165 located above and below the cable driver permit its rotational movement as cable 51 is turned.

As shown in FIGS. 10 and 11, the bottom surface of cable driver 161 includes ratchet teeth 167 for permitting ratcheting, free wheeling, movement of the cable driver 161 with respect to gear 49'. Similarly, gear 49' includes ratchet surfaces 169 on its upper surface for permitting movement of the front wheel during, for example, coasting when the pedals are not being driven.

As will suggest itself, the gear 49 of FIG. 7, may include similar ratcheting structure to permit its free wheeling also.

According to the present invention, the dual driven cycle kit provides components which are quick and easy to attach or detach, which are easy and inexpensive to manufacture, and which offer reliable and extended operation. A number of alternative embodiments of the present invention have been disclosed herein. As will suggest itself, the kit may be used with a tricycle as well as a bicycle. Also, a drive shaft with universal couplings may be used in place of cable 51.

It is to be understood, however, that various changes and modifications may be made without departing from the true scope and spirit of the present invention as set forth and defined in the following claims.

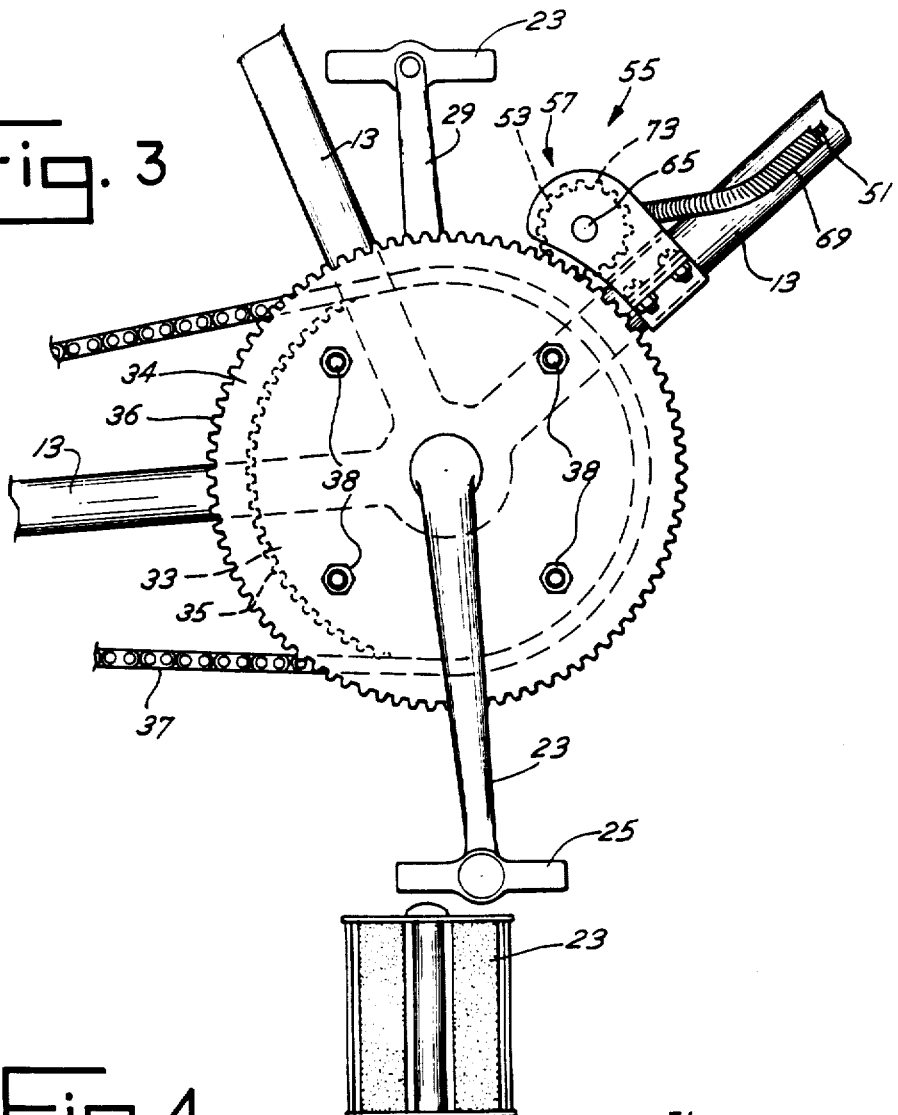
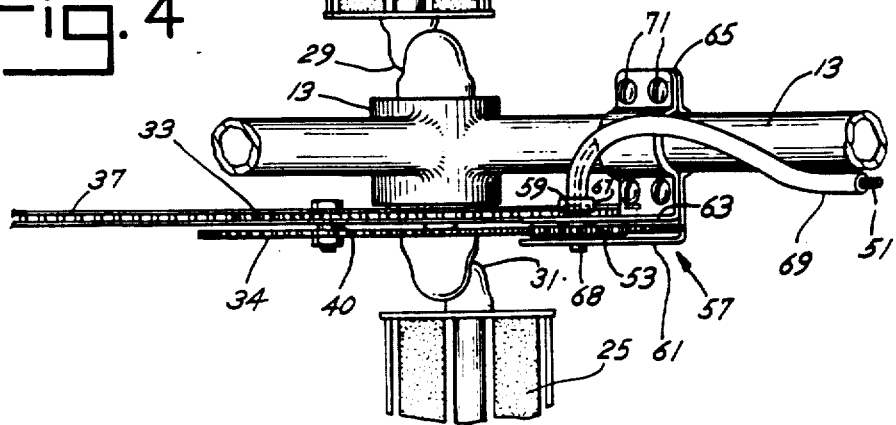

What is claimed is:

1. A kit for converting a bicycle having a frame, a first motive means including pedals, pedal gear, and chain, a pedal-chain driven first wheel and a non-driven second wheel, into a dual wheel driven bicycle, comprising:
   a sprocket connectable in a fixed relation to the second wheel for conjoint movement therewith;
   a drive gear means mountable with respect to the frame in the area of said first motive means, said drive gear means including a rotatable drive gear connectable to the first motive means for receiving power therefrom to rotate said drive gear;
   a cable gear mountable with respect to the frame and meshable with said sprocket for driving said sprocket; and
   a rotatable drive cable drivingly connectable at one end to said drive gear and at its opposite end to said cable gear for transferring the rotational motion of said drive gear to the second wheel, said rotatable drive cable being elongated and having an elongated internal axis extending between said one end and said opposite end, said rotatable drive cable rotatable about said elongated internal axis for transferring said rotational motion of said drive gear to said second wheel.

2. A kit as claimed in claim 1 wherein said drive gear means comprises a gear support structure fixable to the frame for supporting said drive gear in relation to the pedal gear of the first motive means, said drive gear means connectable to the first motive means for receiving power directly from the pedal gear.

3. A kit as claimed in claim 2 wherein said gear support structure comprises:
   a housing for supporting said drive gear and receiving said drive cable for attachment to said drive gear;
   means for rotatably mounting said drive gear to said housing; and
   means for mounting said housing to the frame.

4. A kit as claimed in claim 1, the bicycle having a fork, further comprising a spread clamp for fixedly attaching the cable gear to the fork.

5. A kit as claimed in claim 1 further comprising a speed control lever or moving the cable gear relative to the sprocket in response to operator gear selection.

6. A dual drive cycle comprising, in combination:
   a frame;
   a pair of axles mounted onto said frame;
   a first wheel rotatably mounted onto one of said axles;
   a second wheel rotatably mounted onto the other of said axles;
   a first sprocket fixed to said first wheel for conjoint rotational movement therewith;
   a second sprocket fixed with respect to said second wheel for conjoint rotational movement therewith;
   a first motive means carried by said frame and manually operable for driving said first wheel, said first motive means including:
   (1) operator controlled pedals;
   (2) a pedal gear connected to said pedals and rotatably mounted with respect to said frame for operator rotation by operator movement of said pedals; and
   (3) a chain connecting said pedal gear with said first sprocket for rotating said first wheel upon rotation of said pedal gear; and
   a second motive means carried by said frame for driving said second wheel, said second motive means including:
   (1) a drive gear means mounted with respect to the frame in the area of said first motive means, said drive gear means including a rotatable drive gear connected to the first motive means for receiving power therefrom to rotate said drive gear;
   (2) a cable gear mounted with respect to the frame and meshed with said sprocket for driving said sprocket; and
   (3) a rotatable drive cable drivingly connected at one end to said drive gear and at its opposite end to said cable gear, said drive cable transferring the rotational motion of said drive gear to the second wheel, said rotatable drive cable being elongated and having an elongated internal axis extending between said one end and said opposite end, said rotatable drive cable rotatable about said elongated internal axis for transferring said rotational motion of said drive gear to said second wheel.

7. A dual drive cycle as claimed in claim 6 further comprising a crank having two arms each centrally attached to the pedal gear on one end for driving the pedal gear and attached to a pedal on its other end for driving the crank.

8. A dual drive cycle as claimed in claim 6 further comprising a gear selector for selecting the gear at which the cycle is driven.

9. A dual drive cycle as claimed in claim 6 further comprising a seat adjustably mounted on the frame for positioning the operator.

10. A dual drive cycle as claimed in claim 6 wherein the pedal gear has teeth on its periphery for interacting with the drive gear of the second motive means.

11. A dual drive cycle as claimed in claim 6 further comprising plastic straps for attaching the drive cable to the frame.

12. A dual drive cycle as claimed in claim 6 further comprising a spread clamp for fixedly attaching the cable gear to the frame.

13. A dual driven cycle as claimed in claim 6 further comprising a speed control lever for moving the cable gear relative to the second sprocket in response to operator gear selection.

14. A kit for converting a bicycle, the bicycle having:
a frame;
a pair of axles mounted onto said frame;
a first wheel rotatably mounted onto one of said axles;
a second wheel rotatably mounted onto the other of said axles;
a first sprocket fixed to said first wheel for conjoint rotational movement therewith;
a first motive means carried by said frame and manually operable for driving said first wheel, said first motive means including:
  (1) operator controlled pedals;
  (2) a pedal gear connected to said pedals and rotatably mounted with respect to said frame for operator rotation by operator movement of said pedals; and
  (3) a chain connecting said pedal gear with said first sprocket for rotating said first wheel upon rotation of said pedal gear;
said kit for converting said bicycle into a dual wheel drive cycle, said kit comprising in combination:
a second sprocket;
means for fixing said second sprocket with respect to said second wheel for conjoint rotational movement therewith;
a second motive means;
means for carrying said second motive means by said frame for driving said second wheel;
said second motive means including:
  (1) a drive gear means mountable with respect to said frame in the area of said first motive means, including a rotatable drive gear connectable to said first motive means for being rotated thereby;
  (2) a cable gear mountable with respect to the frame and meshable with said second sprocket for driving said second sprocket; and
  (3) a rotatable cable drivingly connected at one end to said drive gear and at its opposite end to said cable gear, said cable transferring the rotational motion of said drive gear to the second wheel;
wherein said drive gear means comprises a gear support structure fixable to the frame for supporting said drive gear in relation to the pedal gear of the first motive means, said drive gear means connectable to the first motive means for receiving power directly from the pedal gear.

15. A kit as in claim 14 wherein said gear support structure comprises:
a housing for supporting said drive gear and receiving said drive cable for attachment to said drive gear;
means for rotatably mounting said drive gear to said housing; and
means for mounting said housing to the frame.

16. A kit for converting a bicycle, the bicycle having:
a frame;
a pair of axles mounted onto said frame;
a first wheel rotatably mounted onto one of said axles;
a second wheel rotatably mounted onto the other of said axles;
a first sprocket fixed to said first wheel for conjoint rotational movement therewith;
a first motive means carried by said frame and manually operable for driving said first wheel, said first motive means including:
  (1) operator controlled pedals;
  (2) a pedal gear connected to said pedals and rotatably mounted with respect to said frame for operator rotation by operator movement of said pedals; and
  (3) a chain connecting said pedal gear with said first sprocket for rotating said first wheel upon rotation of said pedal gear;
said kit for converting said bicycle into a dual wheel drive cycle, said kit comprising in combination:
a second sprocket;
means for fixing said second sprocket with respect to said second wheel for conjoint rotational movement therewith;
a second motive means;
means for carrying said second motive means by said frame for driving said second wheel;
said second motive means including:
  (1) a drive gear means mountable with respect to said frame in the area of said first motive means, including a rotatable drive gear connectable to said first motive means for being rotated thereby;
  (2) a cable gear mountable with respect to the frame and meshable with said second sprocket for driving said second sprocket; and
  (3) a rotatable cable drivingly connected at one end to said drive gear and at its opposite end to said cable gear, said cable transferring the rotational motion of said drive gear to the second wheel;
wherein the drive gear has fingers on its periphery for meshing with the second motive means and rotating the drive gear in a direction opposite the direction of rotation of the pedal gear and chain.

17. A kit as in claim 16 wherein the second sprocket has slots aligned in a series of radially spaced concentric circles for engaging the cable gear.

* * * * *

UNITED STATES PATENT AND TRADEMARK OFFICE
CERTIFICATE OF CORRECTION

PATENT NO.   :  5,004,258
DATED        :  April 2, 1991
INVENTOR(S)  :  Billie J. Becoat It is certified that error appears in the above-identified patent and that said Letters Patent is hereby corrected as shown below:

IN THE DRAWINGS:

Delete sheet 2 of the drawings as published and substitute in lieu thereof the attached Fig. 3 and Fig. 4.

Signed and Sealed this

Ninth Day of February, 1993

Attest:

STEPHEN G. KUNIN

*Attesting Officer*   *Acting Commissioner of Patents and Trademarks*